United States Patent
Billman et al.

(10) Patent No.: US 10,717,604 B2
(45) Date of Patent: Jul. 21, 2020

(54) FIXED SHAFT DRIVE ASSEMBLY

(71) Applicant: Omar Associates, LLC, Omar, OH (US)

(72) Inventors: Chad W. Billman, Sandusky, OH (US); Eric J. Wise, Monroeville, OH (US)

(73) Assignee: Omar Associates, LLC, Omar, OH (US)

( * ) Notice: Subject to any disclaimer, the term of this patent is extended or adjusted under 35 U.S.C. 154(b) by 341 days.

(21) Appl. No.: 15/971,286

(22) Filed: May 4, 2018

(65) Prior Publication Data

US 2018/0319599 A1    Nov. 8, 2018

Related U.S. Application Data

(60) Provisional application No. 62/502,644, filed on May 6, 2017.

(51) Int. Cl.
  *B65G 23/06*    (2006.01)
  *F16H 57/00*    (2012.01)
  (Continued)

(52) U.S. Cl.
  CPC .............. *B65G 23/06* (2013.01); *A21B 1/48* (2013.01); *B65G 21/18* (2013.01); *B65G 23/24* (2013.01);
  (Continued)

(58) Field of Classification Search
  CPC .... B65G 21/18; B65G 23/08; B65G 2207/24; B65G 2207/44; A21B 1/48; F25D 13/06;
  (Continued)

(56) References Cited

U.S. PATENT DOCUMENTS 4,579,218 A * 4/1986 Park ....................... B65G 21/18
                                                    198/778
4,741,430 A * 5/1988 Roinestad ............. B65G 23/34
                                                    198/778

(Continued)

*Primary Examiner* — Gene O Crawford
*Assistant Examiner* — Keith R Campbell
(74) *Attorney, Agent, or Firm* — Rankin, Hill & Clark LLP

(57) ABSTRACT

A linear fixed shaft drive assembly for use in a self-stacking industrial/commercial-grade spiral/gyro oven or freezer that includes a fixed, non-rotatable shaft having a cylindrical mounting portion, a bearing cup supported by the mounting portion, and a hub and shaft base that includes a shaft portion and flange portion. The flange portion is configured to couple to a first side of a flange extending from the bearing cup. A sprocket is mounted to an opposite second side of the flange extending from the bearing cup. The sprocket includes teeth configured to engage with a ball chain assembly of the oven or freezer. The bearing cup includes at least two permanently lubricated bearings. Rotation of the shaft portion of the hub and shaft base causes the bearing cup and sprocket to rotate on the mounting portion of the fixed, non-rotatable shaft. Also a method for retrofitting an oven or freezer having an existing shaft assembly mounted within a thermal chamber of the oven or freezer, and a method for servicing an oven or freezer having an existing linear fixed shaft drive assembly.

14 Claims, 4 Drawing Sheets

(51) Int. Cl.
*F16C 35/02* (2006.01)
*B65G 23/24* (2006.01)
*A21B 1/48* (2006.01)
*B65G 21/18* (2006.01)
*F25D 13/06* (2006.01)

(52) U.S. Cl.
CPC ......... *F16C 35/02* (2013.01); *F16H 57/0025* (2013.01); *B65G 2207/24* (2013.01); *B65G 2207/44* (2013.01); *B65G 2812/02089* (2013.01); *F16H 2057/0068* (2013.01); *F25D 13/06* (2013.01)

(58) Field of Classification Search
CPC ................. F16C 35/02; F16H 57/0025; F16H 2057/0068
USPC ....................................................... 198/778
See application file for complete search history.

(56) References Cited

U.S. PATENT DOCUMENTS

| | | | | |
|---|---|---|---|---|
| 4,850,475 A * | 7/1989 | Lupo | ...................... | B65G 21/18 198/778 |
| 4,852,720 A * | 8/1989 | Roinestad | ............... | B65G 21/18 198/778 |
| 4,866,354 A * | 9/1989 | Miller | .................... | B65G 21/18 318/67 |
| 5,078,120 A | 1/1992 | Hwang | | |
| 5,850,781 A * | 12/1998 | Kuenen | .................... | A21B 1/48 99/443 C |
| 8,727,109 B2 * | 5/2014 | Layne | .................. | B65G 17/086 198/778 |

* cited by examiner

SECTION A-A

FIXED SHAFT DRIVE ASSEMBLY

CROSS-REFERENCE TO RELATED APPLICATIONS

This application claims priority to U.S. Provisional Pat. App. Ser. No. 62/502,644, filed May 6, 2017.

BACKGROUND OF INVENTION

Field of Invention

The present invention provides a linear fixed shaft drive assembly for use in self-stacking industrial/commercial-grade spiral/gyro ovens and freezers.

Brief Description of Related Art

Spiral conveyor systems (sometimes also referred to as "gyro" conveyor systems) are used in industrial/commercial ovens and freezers to convey food through a thermally controlled chamber. In the case of an oven, food products are conveyed on the conveyor through a heated chamber and are thereby cooked for the duration it takes to travel through the heated chamber. In the case of a freezer, food products are conveyed on the conveyor through a chilled chamber and are frozen by the time they exit the chamber. Hwang, U.S. Pat. No. 5,078,120, for example, depicts an oven of this type.

Due to the extreme temperatures within the thermal chamber, it is conventional for the spiral conveyor to be driven by two motors that are mounted external to the thermal chamber. Each of the motors drives (rotates) a shaft that extends into the thermal chamber. The shaft, via intermediate couplings, ultimately couples to and rotates a shaft of a shaft assembly that is mounted within the thermal chamber. A sprocket is mounted to the rotating shaft of the shaft assembly. The sprocket engages with a ball chain assembly, which is guided along rails that define the conveyor path. Rotation of the shaft of the shaft assembly by the externally mounted motor rotates the sprocket fixed to the shaft of the shaft assembly, and thus drives the ball chain assembly on one side of the conveyor system. The second external motor drives the ball chain assembly on the other side of the conveyor system.

FIG. 1 shows a portion of an exemplary prior art shaft assembly 10. FIG. 2 shows a top plan view of the exemplary prior art shaft assembly shown in FIG. 1. And FIG. 3 shows a section view of the exemplary prior art shaft assembly shown in FIG. 2 along the line A-A. The prior art shaft assembly shown in FIGS. 1-3 includes a shaft 20 supported by a first bearing 30 and a second bearing 40, each of which are mounted with respective first and second bearing housings 50, 60. Fasteners (not shown) pass through bores 70 provided in the bearing housings to allow the shaft assembly to be mounted to a mounting surface within the thermal chamber of the oven or freezer such that the shaft has a generally vertical orientation. A portion of the shaft that extends axially past the second bearing in a direction away from the first bearing includes a first slot 80 and a second slot 90. The first slot allows for the keyed mounting of a sprocket (not shown) that rotates with the shaft and thus drives the ball chain assembly (not shown). The second slot allows for the keyed mounting of the shaft to a shaft assembly extending from the drive motor mounted externally to the thermal chamber. The bearings must be lubricated use, and thus the shaft assembly includes first and second ports 100, 110 for receiving a flow of lubrication to the bearings through lubricating fluid lines (not shown). Exit ports (not shown) are also provided, to allow the lubricating fluid to flow through the bearings.

Although prior art shaft assemblies such as described with reference to FIGS. 1-3 have been in use in ovens and freezers for decades, they present substantial maintenance challenges. These challenges can be summarized as follows:

Short bearing life;
  High temperature carbon steel bearings wear quickly at elevated temperatures and are unacceptable for use in food production machinery since they corrode in the environment.
  Bearings require a pressurized lubrication system.
Challenging clearances that make setup difficult;
  Multiple shims are required to adjust the shaft end play.
  Components have to be disassembled multiple times to install and to remove shims.
Difficulty in keeping components adjusted as they wear;
  Fasteners are difficult to access.
  Shims must be added or removed.
  Wear is difficult to measure while the assembly is installed.
Difficulty in keeping components tight during operation;
  Multiple fasteners that are difficult to access
  No way to tighten fasteners.
  The bottom screws remain somewhat loose against the bearing plate.
  High and low temperatures from production and cleaning cycles tend to loosen small fasteners.
Challenge to rebuild in the field because of weight and number of components; and
  The entire assembly must be removed to disassemble the components.
  Bearings must be removed by pressing or by pounding to dislocate them from the housing.
  All components are heavy and odd-shaped.
Pumped lubrication tends to be problematic inside the oven;
  Food grade oil solidifies when flow is restricted and exposed to high temperatures.
  Over time, oil lines become damaged during maintenance work.

Attempts have been made in the past to redesign prior art shaft assemblies to overcome these disadvantages. But no reasonable solutions have heretofore been found. Thus, there is has been a long-felt need in the industry for an improved shaft assembly for use in self-stacking industrial/commercial-grade spiral/gyro ovens and freezers.

BRIEF SUMMARY OF THE INVENTION

The present invention provides a linear fixed shaft drive assembly for use in a self-stacking industrial/commercial-grade spiral/gyro oven or freezer. The linear fixed shaft drive assembly comprises a fixed, non-rotatable shaft having a cylindrical mounting portion, a bearing cup supported by the mounting portion of the fixed, non-rotatable shaft, and a hub and shaft base comprising a shaft portion and flange portion. The flange portion is configured to couple to a first side of a flange extending from the bearing cup. And, a sprocket is mounted to an opposite second side of the flange extending from the bearing cup. The sprocket includes teeth configured to engage with a ball chain assembly of the self-stacking industrial/commercial-grade spiral/gyro oven or freezer. The bearing cup comprises at least two permanently lubricated bearings. Rotation of the shaft portion of the hub and shaft base causes the bearing cup and sprocket to rotate on the mounting portion of the fixed, non-rotatable shaft.

In preferred embodiments, the fixed, non-rotatable shaft is joined to a first mounting bracket and a second mounting bracket. The bearings are preferably made of stainless steel. The bearings are preferably permanently lubricated with a food grade lubricant. The linear fixed shaft drive assembly preferably further comprises fasteners that extend through the hub and shaft base and secure the sprocket to the bearing cup and the bearing cup to the hub and shaft base. The hub and shaft base also preferably includes a recess for receiving and indexing an end portion of the mounting portion of the fixed, non-rotatable shaft. Preferably, bores are provided in the first and second mounting brackets for receiving fasteners that allow the first and second mounting brackets to be mounted to a mounting surface within a thermal chamber of the oven or freezer. Optionally, a plate is mounted to the second mounting bracket. The plate extends radially perpendicular to an axial direction of the fixed shaft. The mounting portion preferably has a diameter that is smaller than a diameter of the fixed shaft extending between the first and second mounting brackets. Preferably, the shaft portion of the hub and shaft base includes a slot for keyed mounting of the shaft portion of the hub and shaft base to a shaft assembly extending from a drive motor mounted externally to a thermal chamber of the oven or freezer.

The present invention also provides a method for retrofitting a self-stacking industrial/commercial-grade spiral/gyro oven or freezer having an existing shaft assembly that is mounted within a thermal chamber of the oven or freezer. The method comprises steps of:
  removing the existing shaft assembly from the oven or freezer;
  providing a linear fixed shaft drive assembly as disclosed herein;
  mounting the linear fixed shaft drive assembly within the thermal chamber of the oven or freezer where the existing shaft assembly was mounted prior to the removing step;
  confirming that the bearing cup of the linear fixed shaft drive assembly is pressed onto the mounting portion of the fixed shaft and that a ball chain assembly of the oven or freezer is engaged with the sprocket of the linear fixed shaft drive assembly; and
  coupling the shaft portion of the hub and shaft base to a shaft assembly extending from a motor mounted external to the thermal chamber of the oven or freezer.

The existing shaft assembly can include a rotating shaft supported by a first bearing housing and a second bearing housing.

The present invention also provides a method for servicing a self-stacking industrial/commercial-grade spiral/gyro oven or freezer having an existing linear fixed shaft drive assembly as disclosed herein, which is mounted within a thermal chamber of the oven or freezer. The method comprises steps of: disengaging a ball chain assembly of the oven or freezer from the sprocket of the existing linear fixed shaft drive assembly; removing the existing hub and shaft base, existing bearing cup and existing sprocket from the mounting portion of the fixed shaft of the existing linear fixed shaft drive assembly; and pressing a replacement assembly comprising a bearing cup, sprocket and hub and shaft base onto the mounting portion of the fixed shaft of the existing linear fixed shaft drive assembly; wherein at least the bearing cup of the replacement assembly is not the same as the existing bearing cup removed in the removing step.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing Figures, please note that.

DETAILED DESCRIPTION OF THE INVENTION

Figure 1:
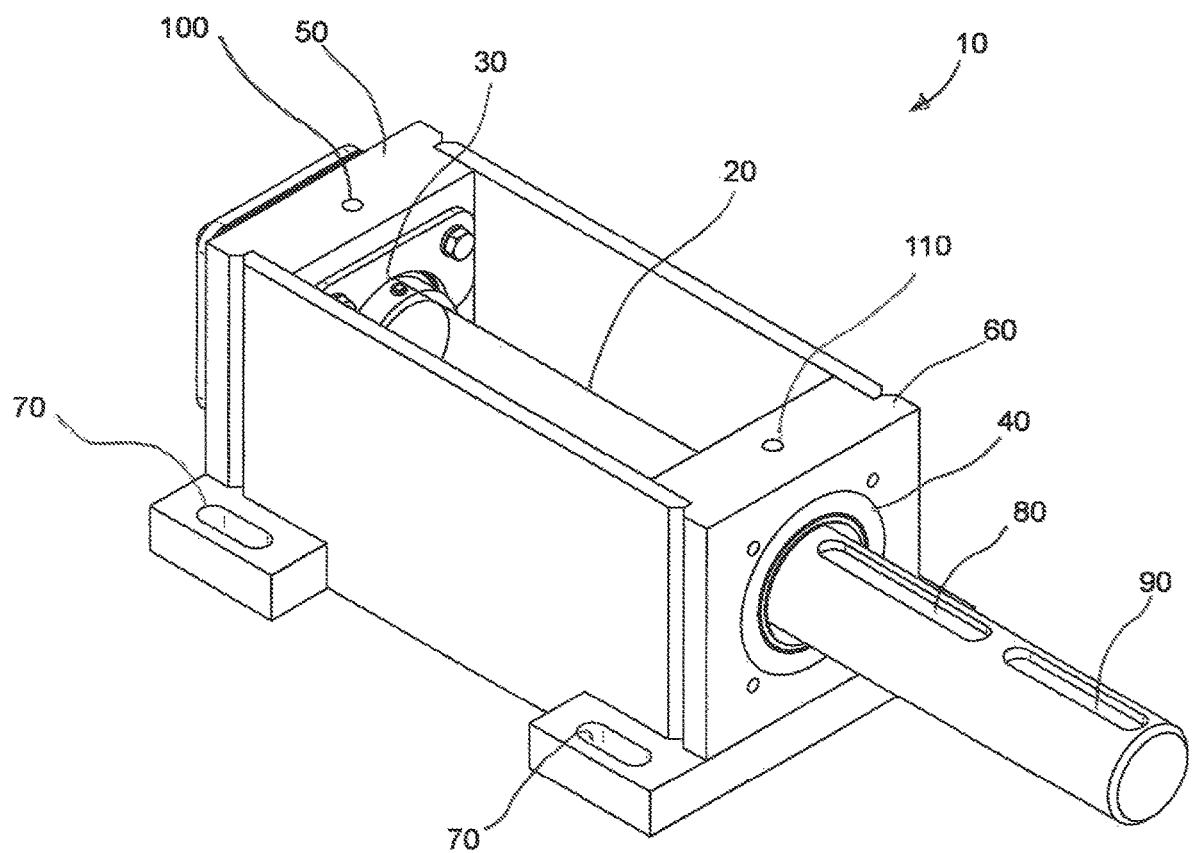
FIG. 1 shows a portion of an exemplary prior art shaft assembly 10.
Figure 2:
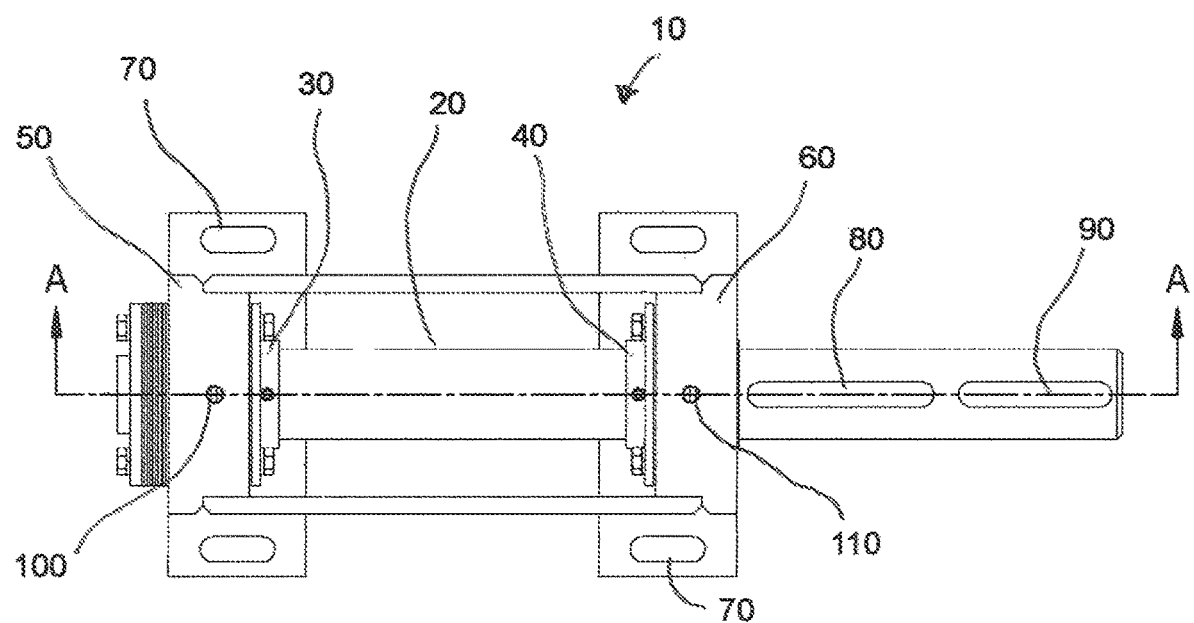
FIG. 2 shows a top plan view of the exemplary prior art shaft assembly shown in FIG. 1.
Figure 3:
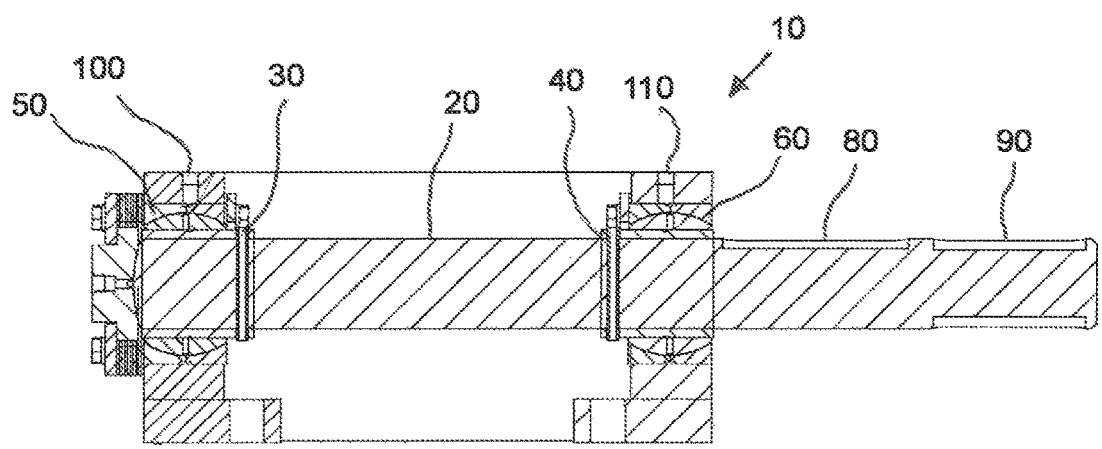
FIG. 3 shows a section view of the exemplary prior art shaft assembly shown in FIG. 2 along the line A-A.
Figure 4:
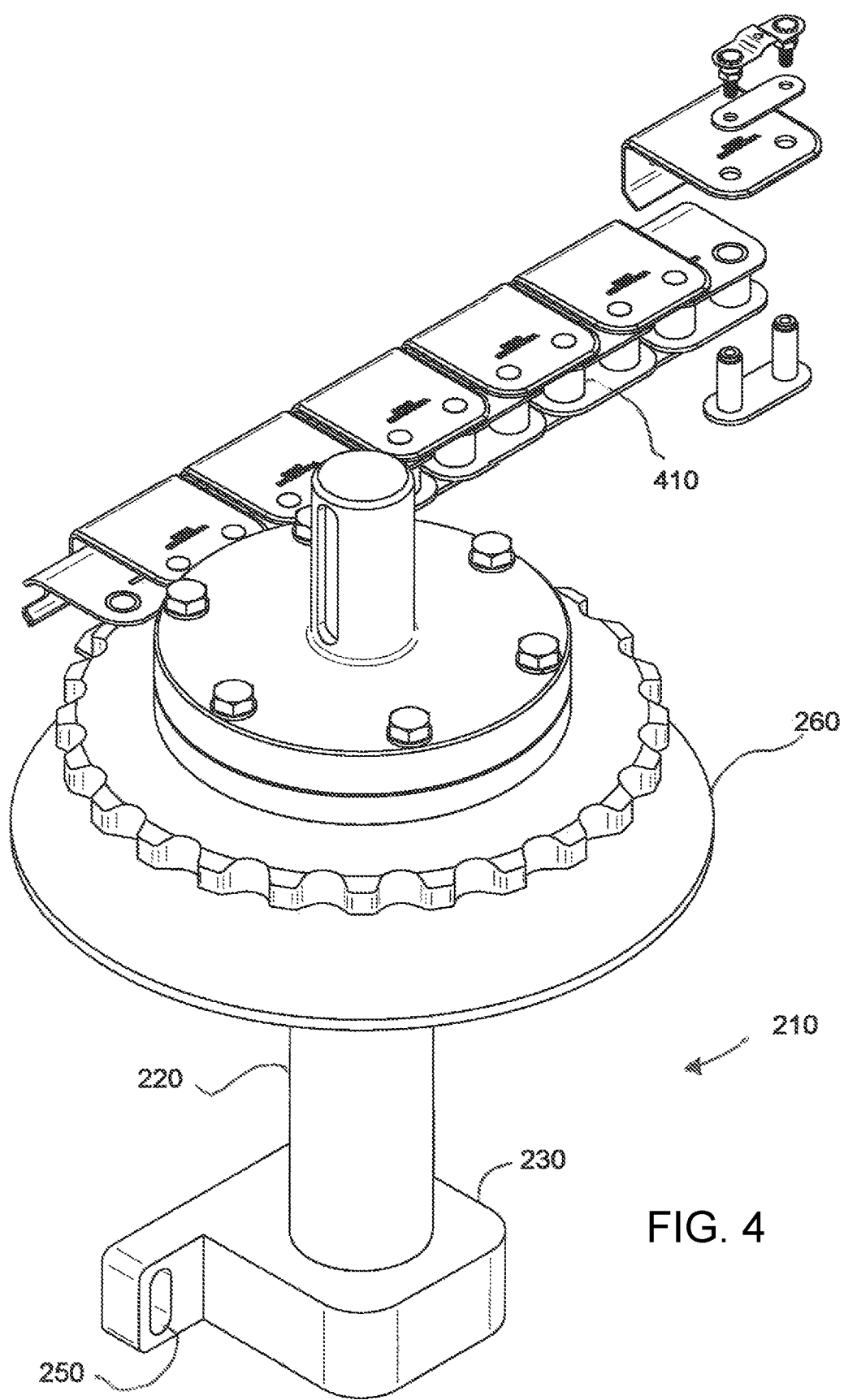
FIG. 4 shows a perspective view of a linear fixed shaft drive assembly and a portion of a ball chain assembly for driving one side of a conveyor of a self-stacking industrial/commercial-grade spiral/gyro oven or freezer.
Figure 5:
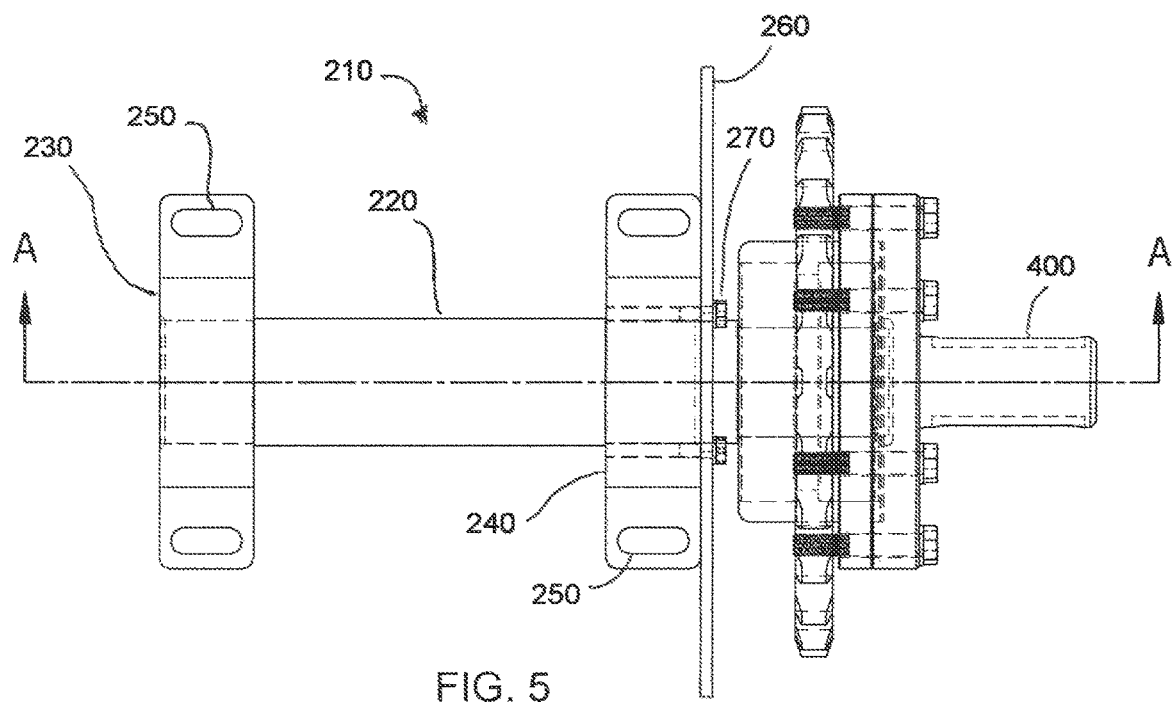
FIG. 5 shows a top plan view with dashed lines showing hidden structure of the linear fixed shaft drive assembly shown in FIG. 4.
Figure 6:
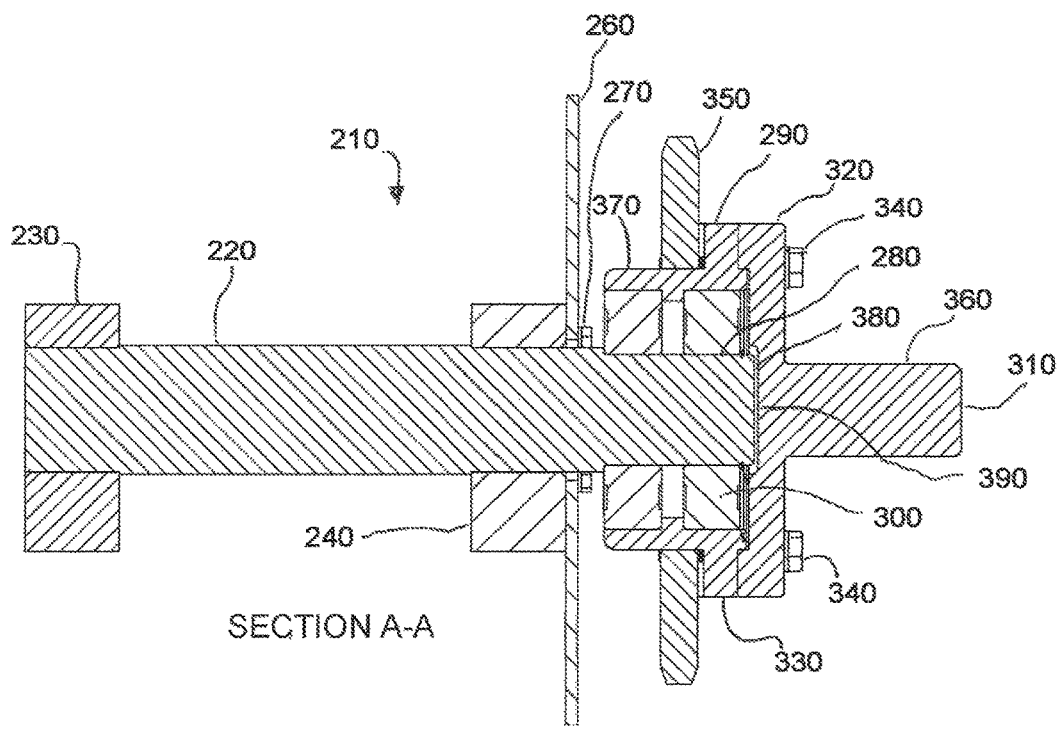
FIG. 6 shows a section view of the exemplary prior art shaft assembly shown in FIG. 5 along the line A-A.

With respect to FIGS. 4-6, the present invention provides a linear fixed shaft drive assembly 210 for use in self-stacking industrial/commercial-grade spiral/gyro ovens and freezers. The linear fixed shaft drive assembly comprises a fixed shaft 220 that is mounted in a non-rotatable manner to (e.g., welded to) a first mounting bracket 230 and a second mounting bracket 240. The entire assembly is sometimes referred to herein as a drive carrier.

Bores 250 are provided in the mounting brackets for receiving fasteners (not shown) to allow the mounting brackets to be mounted to a mounting surface within the thermal chamber of the oven or freezer such that the fixed, non-rotatable shaft has a generally vertical orientation. The location of the bores is predominantly driven by the intended application/use of the linear fixed shaft drive assembly. In situations where the linear fixed shaft drive assembly is to be used as a replacement for (e.g., a retrofit of) a shaft assembly in an existing prior art self-stacking industrial/commercial-grade spiral/gyro oven or freezer, the bores should be provided so as to align with the bores of the shaft assembly being replaced. But in situations where the linear fixed shaft drive assembly is to be used in a newly designed and manufactured self-stacking industrial/commercial-grade spiral/gyro oven or freezer, the bores can be located in an suitable location.

In the embodiment shown in FIGS. 4-6, the linear fixed shaft drive assembly comprises a plate 260, which is mounted to the second mounting bracket and extends radially perpendicular to the axial direction of the fixed shaft using fasteners 270. The plate is optional, but preferred.

A portion of the fixed shaft extends axially past the second bracket in a direction away from the first bracket. In the illustrated embodiment, the diameter of this portion of the shaft, which is heretofore referenced as a mounting portion 280, is smaller than the diameter of the fixed shaft extending between the first and second mounting brackets. It will be appreciated that the fixed shaft can have any diameter or define any cross-section (e.g., be a bar or other shape) between the first and second mounting brackets, but the mounting portion 280 must define a cylindrical shape.

A bearing cup 290 is pressed onto and supported by the mounting portion of the fixed shaft. The bearing cup comprises at least two permanently lubricated stainless steel bearings 300. The bearings are permanently lubricated with food grade lubricant.

The linear fixed shaft drive assembly further comprises a hub and shaft base 310. The hub and shaft base comprises a flange portion 320 that extends beyond the bearing cup and is configured to couple to a flange 330 extending from the bearing cup using fasteners 340. The fasteners also fasten a sprocket 350 to the opposite side of the flange of the bearing cup. Thus, rotation of the shaft portion 360 of the hub and shaft base causes the outer portion 370 of the bearing cup and sprocket to rotate on the mounting portion of the fixed shaft thereby driving the ball chain assembly 410. The hub and shaft base 310 preferable includes a recess 380 for receiving and indexing an end portion 390 of the mounting portion of the fixed shaft.

The shaft portion of the hub and shaft base preferably includes a slot 400. The slot allows for the keyed mounting of the shaft portion of the hub and shaft base to a shaft assembly extending from the drive motor mounted externally to the thermal chamber.

The linear fixed shaft drive assembly according to the invention provides several advantages over prior art shaft assemblies including, but not limited to:

Replaceable bearing cup assembly;
    The assembly can be exchanged relatively easily using standard tools.
    No major disassembly of the drive carrier is required to remove and replace the cup assembly.
Permanently lubricated stainless steel bearings;
    Bearings are pre-lubricated and require no oil lines during the operating life.
    Lubricant is food-grade.
Ease of rebuild;
    Disconnecting a coupling at the top of the shaft portion of the hub and shaft base provides access to the mounting portion of the fixed shaft and bearing cup.
    After removing the sprocket from the hub and shaft base, the bearing cup assembly can easily be replaced.
Extended bearing life;
    Bearings are permanently lubricated prior to installation.
    Bearings are sized to tolerate the high operating temperatures.
Ease of installation;
    Adjusting the sprocket elevation is completed by easily installed shims.
    Standard tools are used to install the bearing cup, shims, and stub shafts.
    Components are relatively lightweight and easy to transport inside the oven.
    Vertical shaft orientation is not disturbed during bearing changes.
All stainless steel components including the bearings; and
The entire assembly is constructed of food-grade materials.

The present invention also provides a method for retrofitting a self-stacking industrial/commercial-grade spiral/gyro oven or freezer. In accordance with the method, the existing shaft assembly is removed. A linear fixed shaft drive assembly as described above is provided. The first and second brackets of the linear fixed shaft drive assembly are mounted using fasteners where the existing shaft assembly used to be located. Next, the bearing cup of the linear fixed shaft drive assembly is pressed onto the mounting portion of the fixed shaft, and the ball chain assembly is engaged with the sprocket. Adjustments are made, as required, to ensure proper alignment and function of the assembly.

The present invention also provides a method for servicing a linear fixed shaft drive assembly according to the invention that is mounted in a self-stacking industrial/commercial-grade spiral/gyro oven or freezer. In accordance with the method, the ball chain assembly is disengaged from the sprocket, and the hub and shaft base is removed from the mounting portion of the fixed shaft. The fasteners connecting the flange of the hub and shaft base, the flange of the bearing cup and the sprocket are removed, and at least the bearing cup is replaced with a new bearing cup. The assembly is reinstalled with the new bearing cup. It will be appreciated that the entire hub and shaft base, bearing cup and sprocket can be replaced instead of just replacing the worn bearing cup and/or sprocket.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A linear fixed shaft drive assembly for use in a self-stacking industrial/commercial-grade spiral/gyro oven or freezer, comprising:
    a fixed, non-rotatable shaft having a cylindrical mounting portion;
    a bearing cup supported by the mounting portion of the fixed, non-rotatable shaft;
    a hub and shaft base comprising a shaft portion and flange portion, wherein the flange portion is configured to couple to a first side of a flange extending from the bearing cup; and
    a sprocket mounted to an opposite second side of the flange extending from the bearing cup, said sprocket including teeth configured to engage with a ball chain assembly of the self-stacking industrial/commercial-grade spiral/gyro oven or freezer;
    wherein the bearing cup comprises at least two permanently lubricated bearings, and
    wherein rotation of the shaft portion of the hub and shaft base causes the bearing cup and sprocket to rotate on the mounting portion of the fixed, non-rotatable shaft.

2. The linear fixed shaft drive assembly according to claim 1, wherein the fixed, non-rotatable shaft is joined to a first mounting bracket and a second mounting bracket.

3. The linear fixed shaft drive assembly according to claim 1, wherein the bearings are made of stainless steel.

4. The linear fixed shaft drive assembly according to claim 1, wherein the bearings are permanently lubricated with a food grade lubricant.

5. The linear fixed shaft drive assembly according to claim 1, further comprising fasteners that extend through the hub and shaft base and secure the sprocket to the bearing cup and the bearing cup to the hub and shaft base.

6. The linear fixed shaft drive assembly according to claim 1, wherein the hub and shaft base includes a recess for receiving and indexing an end portion of the mounting portion of the fixed, non-rotatable shaft.

7. The linear fixed shaft drive assembly according to claim 2, wherein bores are provided in the first and second mounting brackets for receiving fasteners that allow the first and second mounting brackets to be mounted to a mounting surface within a thermal chamber of the oven or freezer.

8. The linear fixed shaft drive assembly according to claim 2, further comprising a plate, said plate being mounted to the second mounting bracket.

9. The linear fixed shaft drive assembly according to claim 8, wherein the plate extends radially perpendicular to an axial direction of the fixed shaft.

10. The linear fixed shaft drive assembly according to claim 2, wherein the mounting portion has a diameter that is smaller than a diameter of the fixed shaft extending between the first and second mounting brackets.

11. The linear fixed shaft drive assembly according to claim 1, wherein the shaft portion of the hub and shaft base includes a slot for keyed mounting of the shaft portion of the hub and shaft base to a shaft assembly extending from a drive motor mounted externally to a thermal chamber of the oven or freezer.

12. A method for retrofitting a self-stacking industrial/commercial-grade spiral/gyro oven or freezer having an existing shaft assembly that is mounted within a thermal chamber of the oven or freezer, the method comprising steps of:
   removing the existing shaft assembly from the oven or freezer;
   providing a linear fixed shaft drive assembly according to claim 1;
   mounting the linear fixed shaft drive assembly within the thermal chamber of the oven or freezer where the existing shaft assembly was mounted prior to the removing step;
   confirming that the bearing cup of the linear fixed shaft drive assembly is pressed onto the mounting portion of the fixed shaft and that a ball chain assembly of the oven or freezer is engaged with the sprocket of the linear fixed shaft drive assembly; and
   coupling the shaft portion of the hub and shaft base to a shaft assembly extending from a motor mounted external to the thermal chamber of the oven or freezer.

13. The method according to claim 12, wherein the existing shaft assembly included a rotating shaft supported by a first bearing housing and a second bearing housing.

14. A method for servicing a self-stacking industrial/commercial-grade spiral/gyro oven or freezer having an existing linear fixed shaft drive assembly according to claim 1 mounted within a thermal chamber of the oven or freezer, the method comprising steps of:
   disengaging a ball chain assembly of the oven or freezer from the sprocket of the existing linear fixed shaft drive assembly;
   removing the existing hub and shaft base, existing bearing cup and existing sprocket from the mounting portion of the fixed shaft of the existing linear fixed shaft drive assembly; and
   pressing a replacement assembly comprising a bearing cup, sprocket and hub and shaft base onto the mounting portion of the fixed shaft of the existing linear fixed shaft drive assembly;
   wherein at least the bearing cup of the replacement assembly is not the same as the existing bearing cup removed in the removing step.

* * * * *